(12) United States Patent
Walters

(10) Patent No.: US 9,526,256 B1
(45) Date of Patent: Dec. 27, 2016

(54) MIXING PADDLE

(71) Applicant: Francis Walters, Orlando, FL (US)

(72) Inventor: Francis Walters, Orlando, FL (US)

(*) Notice: Subject to any disclaimer, the term of this patent is extended or adjusted under 35 U.S.C. 154(b) by 0 days.

(21) Appl. No.: 15/173,610

(22) Filed: Jun. 3, 2016

Related U.S. Application Data

(60) Provisional application No. 62/171,296, filed on Jun. 5, 2015, provisional application No. 62/345,373, filed on Jun. 3, 2016.

(51) Int. Cl.
| | |
|---|---|
| *B01F 13/00* | (2006.01) |
| *A21C 1/14* | (2006.01) |
| *B01F 7/00* | (2006.01) |
| *A47J 43/07* | (2006.01) |

(52) U.S. Cl.
CPC ............ *A21C 1/141* (2013.01); *A47J 43/07* (2013.01); *A47J 43/0711* (2013.01); *B01F 7/00041* (2013.01); *B01F 7/00283* (2013.01); *B01F 2215/0011* (2013.01)

(58) Field of Classification Search
CPC ........ B01F 7/16; A47J 43/00722; A47J 43/07; A47J 43/0711
USPC .................................. 366/342, 98, 97
See application file for complete search history.

(56) References Cited

U.S. PATENT DOCUMENTS

| | | | |
|---|---|---|---|
| 2,318,534 A * | 5/1943 | Seybert | ............... A47J 43/0711 366/312 |
| 4,311,397 A | 1/1982 | Wright | |
| 4,465,700 A | 8/1984 | Ball | |
| 4,946,285 A * | 8/1990 | Vennemeyer | ........ A47J 43/0711 366/288 |
| 5,354,129 A | 10/1994 | Yowell | |
| 5,462,355 A | 10/1995 | Yowell | |
| 5,556,201 A * | 9/1996 | Veltrop | ............... B01F 7/00208 366/203 |
| 5,738,439 A | 4/1998 | Flower | |
| 5,771,784 A | 6/1998 | Sham | |
| 5,813,761 A | 9/1998 | Redl | |
| 6,146,009 A | 11/2000 | Boers | |
| 6,488,403 B2 | 12/2002 | Lawson | |
| 6,523,994 B2 | 2/2003 | Lawson | |
| 6,871,995 B2 | 3/2005 | Simba | |
| 6,932,503 B2 | 8/2005 | Fallowes | |
| 7,934,867 B2 | 5/2011 | Yatomi et al. | |
| 8,001,920 B2 | 8/2011 | King et al. | |
| 8,267,573 B2 | 9/2012 | Wilson | |
| 8,434,931 B2 | 5/2013 | Beigzadeh et al. | |
| 8,439,554 B2 | 5/2013 | Kaas | |
| 2004/0240313 A1 | 12/2004 | Fallowes | |
| 2006/0171251 A1* | 8/2006 | Busick | ................. A47J 43/0711 366/312 |

* cited by examiner

*Primary Examiner* — Tony G Soohoo
*Assistant Examiner* — Anshu Bhatia
(74) *Attorney, Agent, or Firm* — Bruce E. Weir

(57) ABSTRACT

A mixing paddle for mixing dough and for cutting and mixing dense ingredients such as butter and shortening into dry ingredients such as flour has roughened cutting blades oriented at many angles. Some blades are attached between a central blade support shaft and a symmetrical rim. Blades near the apex of the rim rotate in concentric double cone paths. The blades may have roughed cutting edges to increase variety in fat chunk size and to improve mixing.

8 Claims, 10 Drawing Sheets

MIXING PADDLE

CROSS-REFERENCE TO RELATED APPLICATION

This application claims the benefit of U.S. provisional patent application Ser. No. 62/171,296, filed by the same inventor on Jun. 5, 2015. This application also claims the benefit of U.S. provisional patent application Ser. No. 62/345,373, filed by the same inventor on Jun. 3, 2016.

BACKGROUND

Traditionally, a baker mixes pie crust dough by pressing a pastry cutter against the bottom of a mixing bowl to cut butter and shortening into flour and other dry ingredients. The resulting mixture should have roughly pea-sized lumps of fat distributed evenly throughout the dry ingredients. This is usually achieved by repeatedly rotating a parallel-bladed pastry cutter to different positions, pressing the cutter into the ingredients, then briefly stirring the mix. Hand-mixing cold butter into flour with a pastry cutter can be time-consuming and exhausting.

Optimum cutter blade spacing is crucial to obtaining a proper mix. A pastry cutter with blades that are too far apart leaves oversized, poorly distributed lumps. Blades that are too close together tend to clog and create lumps that are too small to produce a flaky crust. Wire cutters mix poorly and often fail to conform to the contours of a mixing bowl. Mixing machines equipped with standard mixing paddles or dough hooks do little more than push ingredients around a mixing bowl.

Some people avoid the difficulties of making pie crust by purchasing pre-made crusts from stores. However, most people prefer fresh pie crust made to a favorite recipe, no matter how tedious and difficult it is to create. A mixing machine attachment that effectively cuts butter and shortening into dry ingredients would ease and simplify creation of homemade pie crust.

SUMMARY

An embodiment of invention is a food mixing machine attachment that allows a user to cut cold butter and shortening into a flour and dry ingredient mixture. Additionally, the attachment can be used to whip cream quickly and to efficiently mix thick batters, cookie doughs, and other hard-to-mix ingredients. The attachment may be compatible with any type of food mixing machine.

DETAILED DESCRIPTION

In the Summary above and in the Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number) (a second number)," this means a range whose lower limit is the first number and whose upper limit is the second number. F or example, 25 to 100 mm means a range whose lower limit is 25 mm, and whose upper limit is 100 mm.

Figure 1:
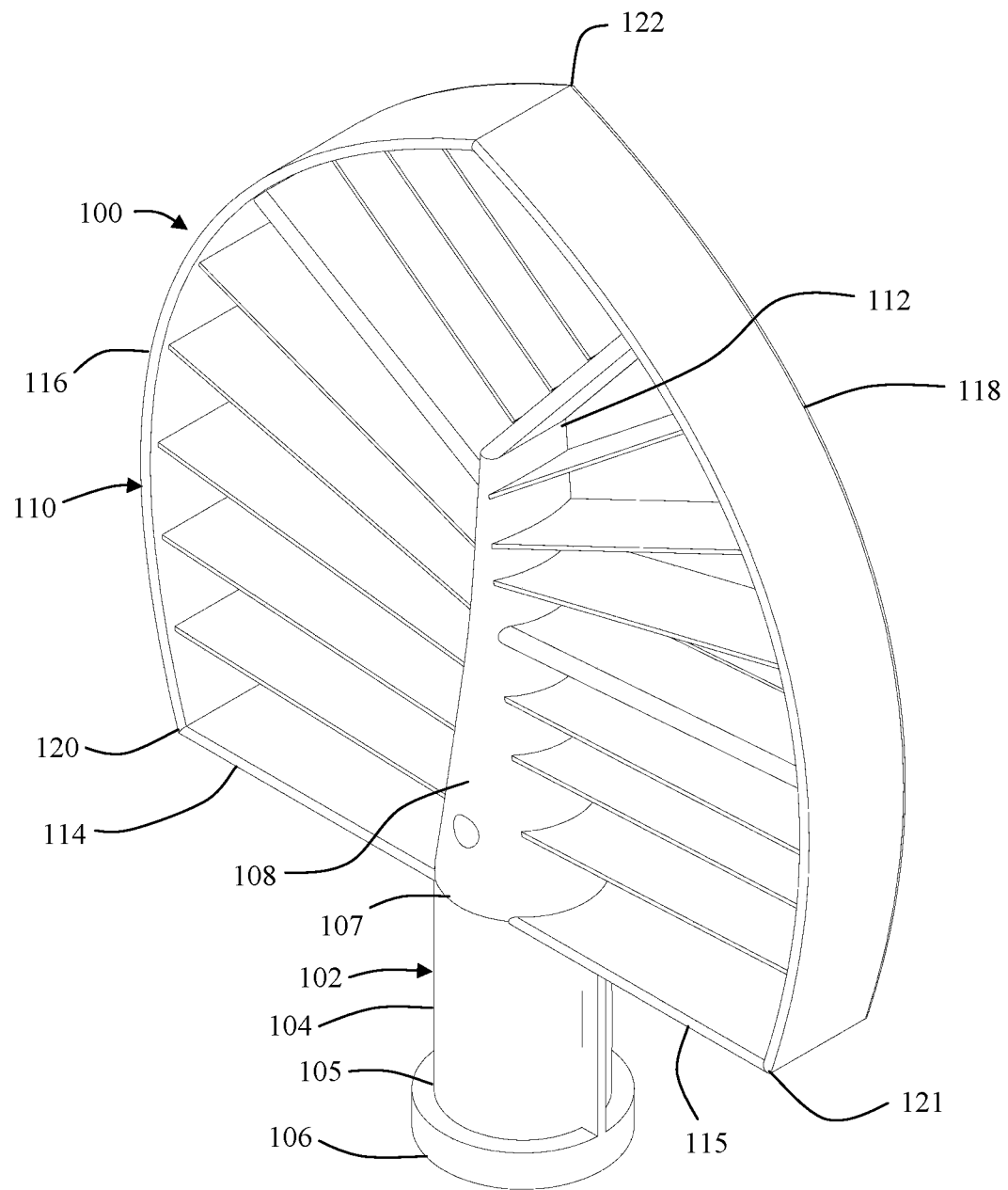
FIG. 1 shows a top right perspective view of an embodiment of the invention.
Figure 2:
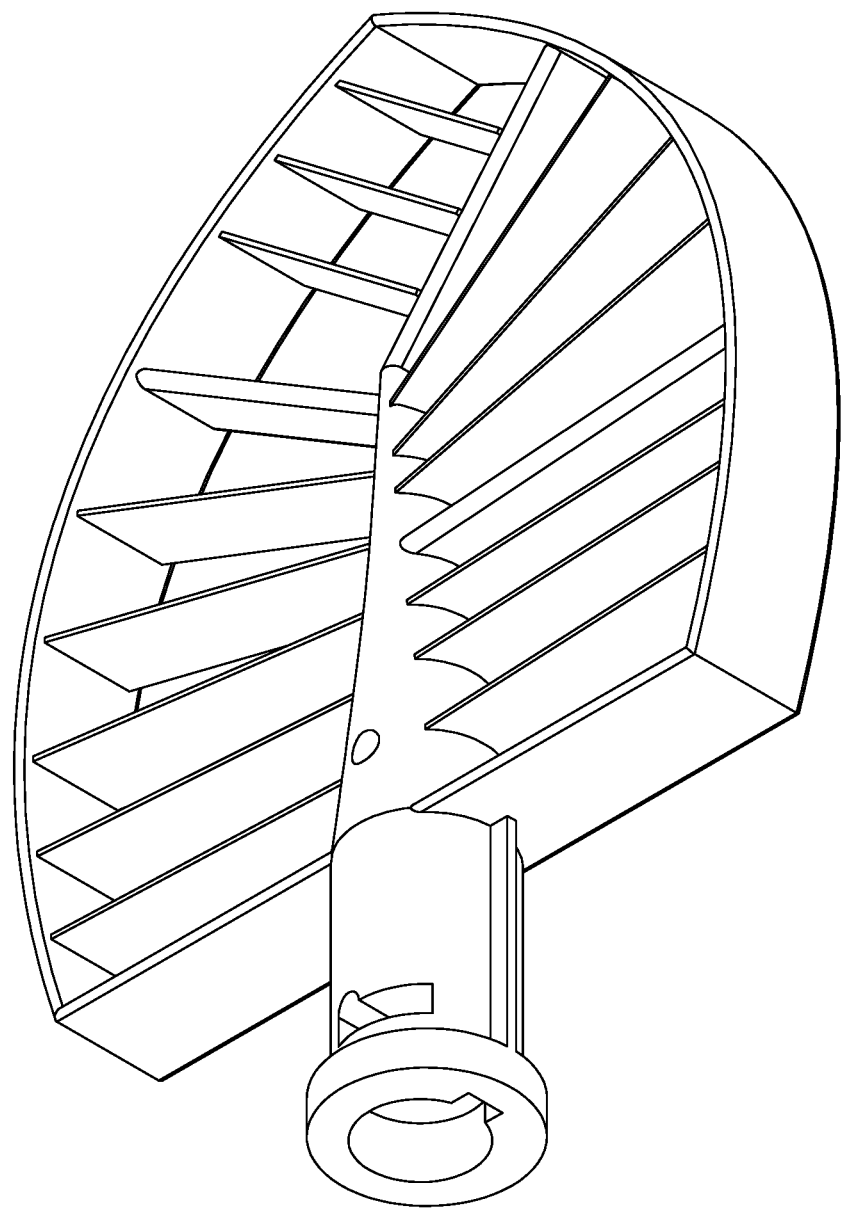
FIG. 2 shows a bottom right perspective view of the embodiment of FIG. 1.
Figure 3:
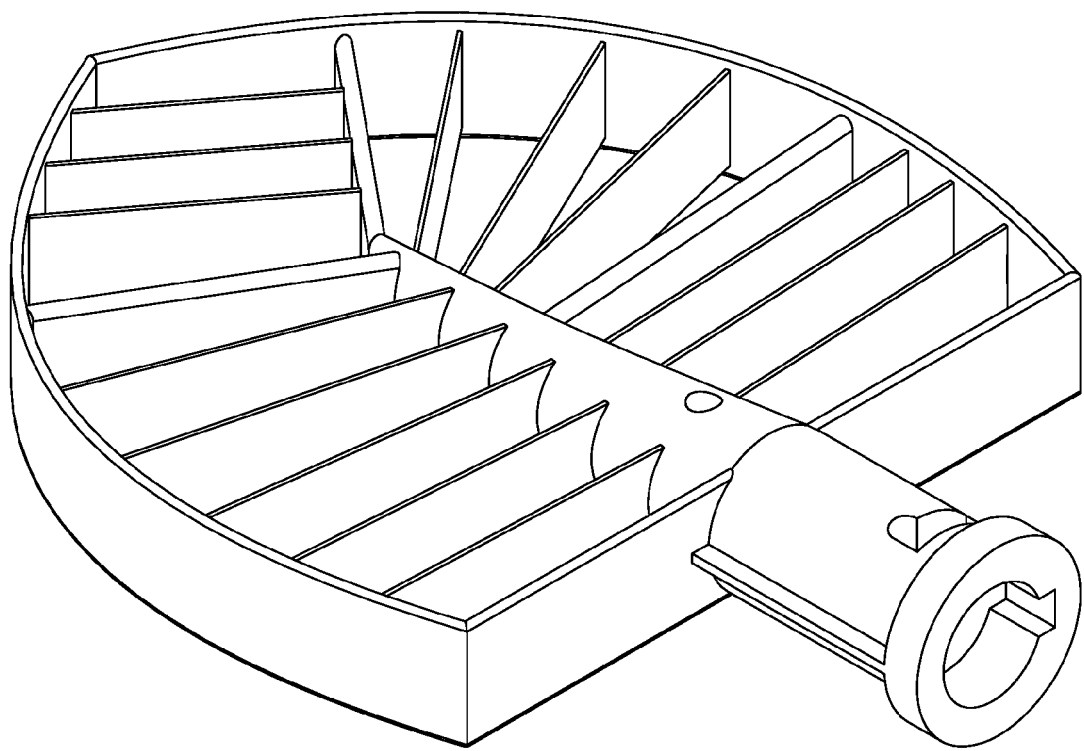
FIG. 3 shows a bottom left perspective view of the embodiment of FIG. 1.
Figure 4:
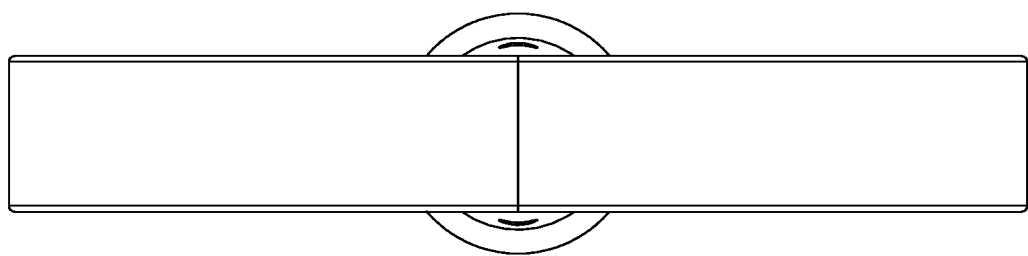
FIG. 4 shows a top plan view of the embodiment of FIG. 1.
Figure 5:
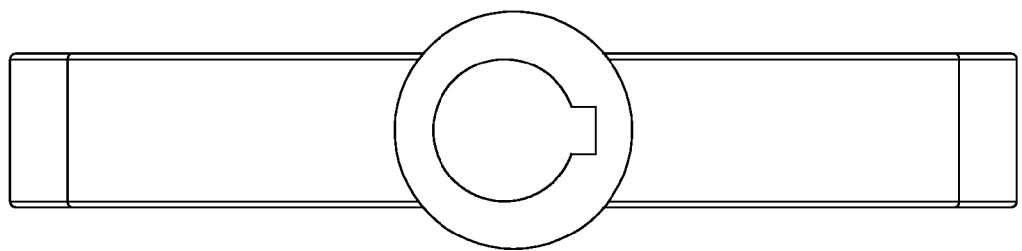
FIG. 5 shows a bottom plan view of the embodiment of FIG. 1.
Figure 6:
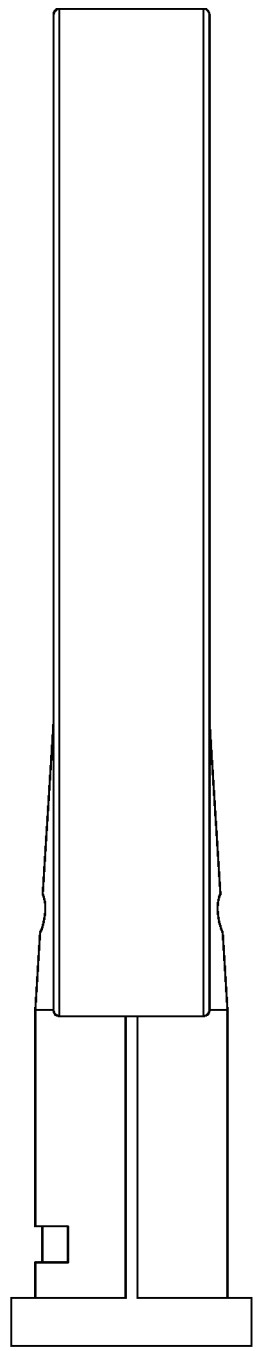
FIG. 6 shows a right elevation view of the embodiment of FIG. 1.
Figure 7:
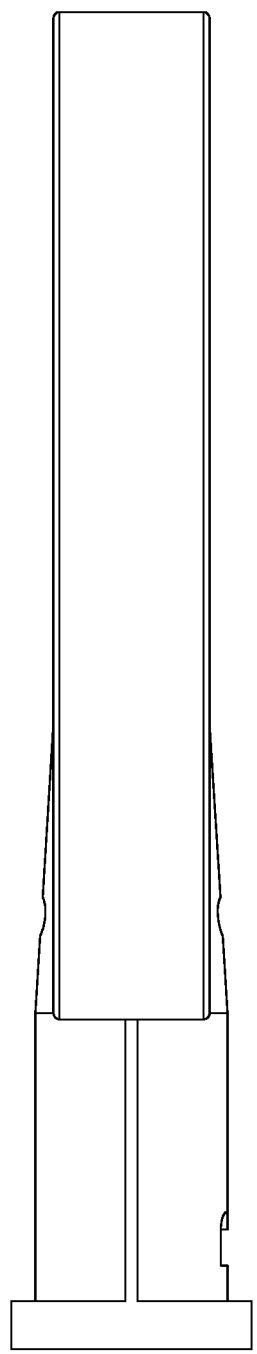
FIG. 7 shows a left elevation view of the embodiment of FIG. 1.
Figure 8:
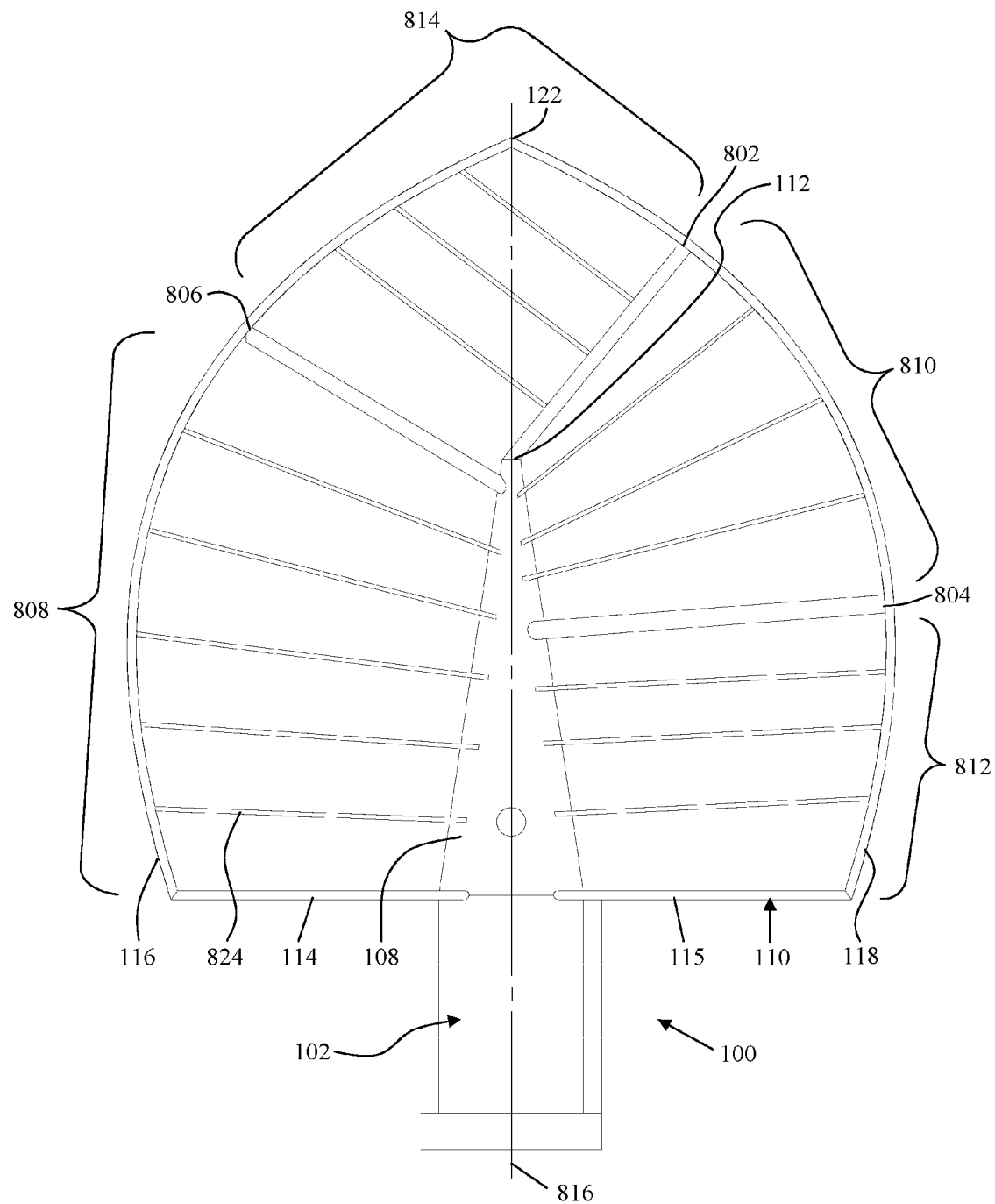
FIG. 8 shows a front elevation view of the embodiment of FIG. 1.
Figure 9:
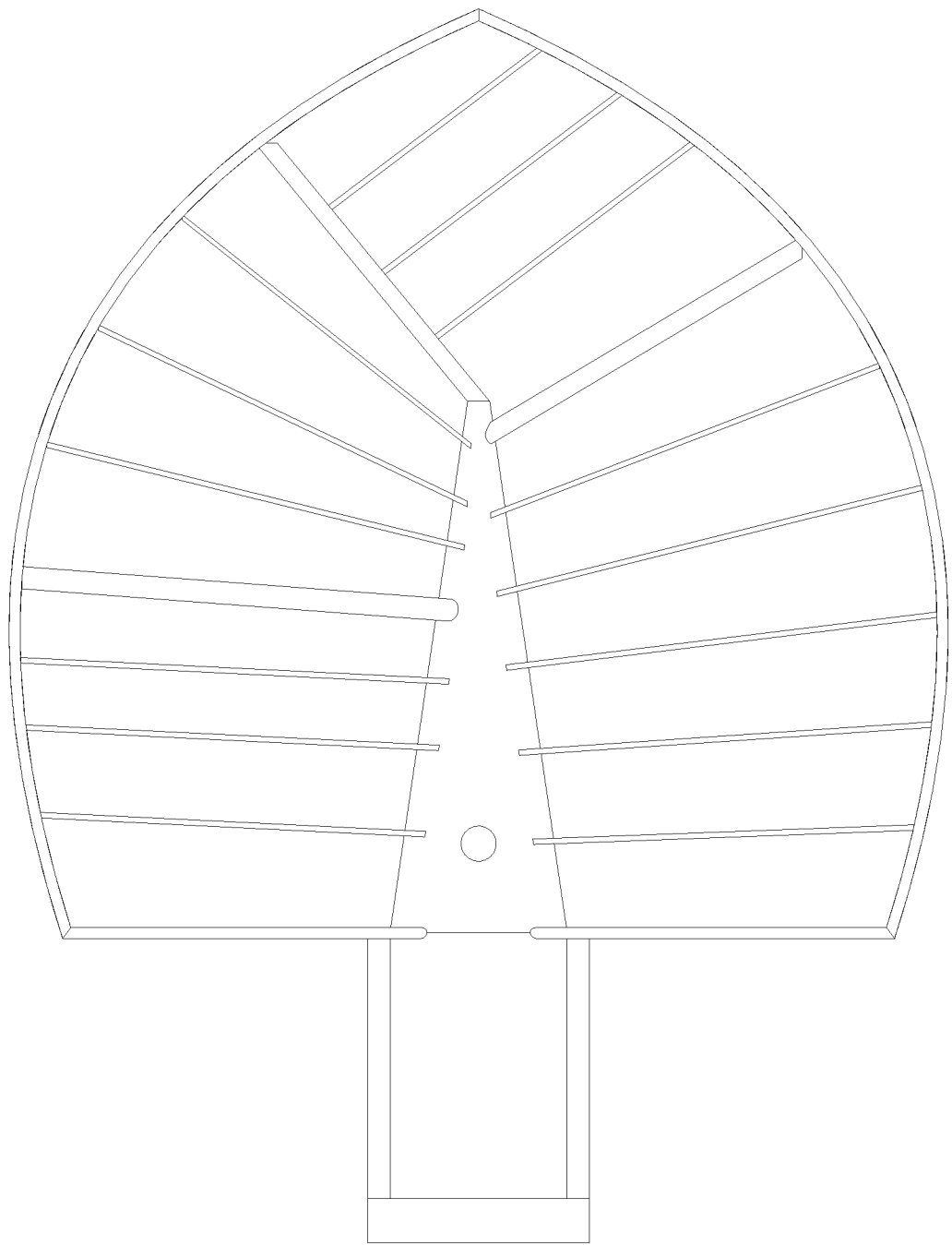
FIG. 9 shows a rear elevation view of the embodiment of FIG. 1.

FIG. 1 shows a top right front perspective view of a mixing paddle 100 that is especially effective for cutting and mixing dense ingredients such as cold butter and shortening into dry and wet ingredients to form pastry dough, cookie dough, thick batter and other non-uniform mixtures. The mixing paddle 100 of FIG. 1 has a central shaft 102 with a cylindrical base member 104 terminated at a first base member end 105 by an attachment member 106. The base members 104 and attachment members 106 shown in FIGS. 1, 8 and 9 represent a generalized form that may in alternate embodiments include holes, splines, flanges and other structures known in the art to be suitable for attaching the mixing paddle 100 to the beater shaft of a stand mixer, or to a hand mixer or other mixing device. FIGS. 2 through 7 show a commonly-used attachment member. Once attached to a mixing device the mixing paddle 100 is rotated by the mixing device through ingredients in a mixing bowl in a manner well-known in the art.

In the embodiment of FIG. 1 the central shaft 102 forms a blade support member 108 by tapering along its length from a second base member end 107 to a blade support member end 112. As the central shaft 102 tapers from the second base member end 107 to the blade support member end 112 the cross-sectional dimensions of the blade support member 108 diminish more rapidly on a first transverse axis than on a second transverse axis that is normal to the first transverse axis, resulting in a blade support member 108 with a cross-section that changes from circular near the second base member end 107 to elliptical or stadium-shaped at the blade support member end 112. In this embodiment the longest cross-section dimension of the blade support member end 112 parallels the second transverse axis.

A scutiform rim 110 partially or completely surrounds the blade support member 108. In alternate embodiments the rim 110 may be a Reuleaux triangle or other shape that at least partially conforms to the inner contours of a mixing bowl. In many embodiments a first straight rim member 114 and a second straight rim member 115 radiate from opposite sides of the base member 104 and are normal to the base member 104. The first straight rim member 114 is symmetrical to the second straight rim member 115.

A first curved rim member 116 arcs from a distal end 120 of the first straight rim member 114 to an apex 122 at which first straight rim member 114 joins a second curved rim member 118. The second curved rim member 118 arcs from a distal end 121 of the second straight rim member 115 to the apex 122. The first curved rim member 116 is symmetrical to the second curved rim member 118. The apex 122 is aligned with the center of central shaft 102.

In the embodiment of FIG. 1 the straight and curved rim members 114, 115, 116, 118 are thin, flat and wide. The wide dimension of the apex 122 parallels the second transverse axis of the blade support member end 112. Other embodiments of the invention may employ rim members with circular, triangular or other cross-sectional shapes and proportions. The straight and curved rim members 114, 115, 116, 118 are positioned in reflective symmetry with respect to the blade support member 108 so that the curved rim members 116, 118 travel the same path when the mixing paddle 100 rotates about the long central axis 816 of the central shaft 102.

FIG. 8 shows a front elevation view of the embodiment of FIG. 1. In this embodiment the blade support member end 112 is connected to the second curved rim member 118 by a first rim support member 802. While this embodiment also has second 806 and third 804 rim support members, other embodiments may have more or fewer rim support members that connect the blade support member 108 to the rim 110 to maintain the position of the rim 110 with respect to the central shaft 102. In the embodiment of FIG. 8 the first rim support member 802 joins the second curved rim member 118 at an angle between 80 and 110 degrees and is oriented at a 40 degree angle with respect to the long central axis 816.

A plurality of thin blades 824 also span the area between and are connected to the blade support member 108 and the curved rim members 116, 118. In a preferred embodiment each blade is a thin, straight rectangular metal strip with one long edge having a roughened cutting edge. The roughened edge creates fat chunks of varied sizes and with irregular surfaces. In the embodiment of FIG. 8 the blades are spaced between 6 millimeters and 13 millimeters apart to cut fat into small enough chunks to ensure desired fat distribution while minimizing clogs that may occur between tightly-spaced blades. The rim 110 and the central shaft 102 would have reflective symmetry with respect to a bisecting plane containing the long central axis and bisecting both the rim 110 and the central shaft 102 into equal halves. The wide dimension of each rectangular blade is the minimum distance between the blade's longest edges. In this embodiment all blades are oriented with their wide dimensions normal to the bisecting plane of the mixing paddle 100.

As the mixing paddle 100 rotates through ingredients the rough-edged blades 824 tend to drag fat chunks along rather than slicing through them cleanly, thereby promoting better mixing. Fat chunks of different sizes that are well-distributed in pastry dough produce flakiness in a baked pie crust.

In the embodiment of FIG. 8 the blades 824 are grouped into four enclosed regions defined by the rim members, rim support members and the blade support member. In alternate embodiments blades may be partially enclosed by rim members and/or may serve as support members. In the embodiment of FIG. 8, the fourth enclosed region 808 is bordered by the blade support member 108, the second rim support member 806, a portion of the first curved rim member 116 and the first straight rim member 114. The second enclosed region 810 is bordered by the blade support member 108, the first rim support member 802, a portion of the second curved rim member 118, and the third rim support member 804. The third enclosed region 812 is bordered by the blade support member 108, the third rim support member 804, a portion of the second curved rim member 118 and the second straight rim member 115. The first enclosed region 814 is bordered by the first rim support member 802, the blade support member end 112, the second rim support member 806, a portion of the first curved rim member 116, the apex 122 and a portion of the second curved rim member 118.

The blades 824 in the second 810, third 812 and fourth 808 enclosed regions are all at proximal ends attached to or integral with the blade support member 108 and are oriented in an approximately radial manner with respect to the blade support member 108. The blades 824 in the fourth enclosed region 808 are all at distal ends attached to or integral with the first curved rim member 116, with the blades 824 intersecting the first curved rim member 116 at angles between 80 and 110 degrees. The blades 824 in the second and third enclosed regions 810, 812 are all at distal ends attached to or integral with the second curved rim member 118, with the blades 824 intersecting the second curved rim member 118 at angles between 80 and 110 degrees.

The blades in the first enclosed region 814 span the distance between the first curved rim member 116 and the first rim support member 802. The blades in the first enclosed region 814 are at a distal end attached to or integral with the first curved rim member 116 and at a proximal end attached to or integral with the first rim support member 802. The blades in the first enclosed region 814 are oriented at angles between 85 and 95 degrees with respect to the first rim support member 802, angles between 80 and 110 degrees with respect to the first curved rim member 116, and angles between 50 and 60 degrees with respect to the long central axis 816. In alternate embodiments the first rim support member 802 may be oriented at angles greater or smaller than 40 degrees with respect to the long central axis 816.

In this embodiment roughened edges on blades within the second 810 and third 812 enclosed regions are on an opposite of the bisecting plane with respect to roughened edges on the blades within the fourth enclosed region 808.

Each blade with the first enclosed region 814 may have either or both edges roughened.

When the mixing paddle 100 is rotated about the long axis 816 of the central shaft 102, the blades 824 in the first enclosed region 814 and at least one of blades 824 in the second enclosed region 810 pass through ingredients in a mixing bowl. Since the blades 824 in the second enclosed region 810 and the first rim support member 802 are oriented at angles close to 90 degrees with respect to the blades 824 in the first enclosed region 814, fat chunks and dry ingredients are rapidly cut at different angles.

Additionally, the long axis 816 of the central shaft 102 passes through the blades in the first enclosed region 814. When the mixing paddle 100 is rotated about the long axis 816 of the central shaft 102 the blades in the first enclosed region 814 travel concentric double cone paths, with the joined apices of each pair of conical paths falling between the ends of an individual blade. Portions of each blade 824 in the first enclosed region 814 form different parts of a double cone path while moving in opposite directions. Each blade 824 forms a separate double cone path. Each double cone path is offset from the others. The complex circulation caused by the combined motions of the blades in the first enclosed region 814 results in both rapid cutting and efficient mixing of non-uniform mixtures.

Figure 10:
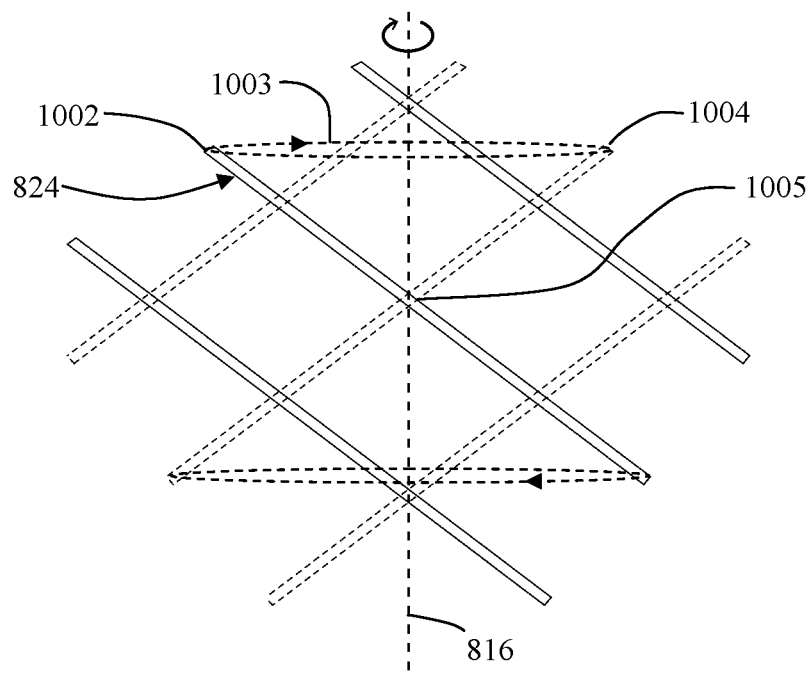
FIG. 10 shows a front elevation view of the blades of the first enclosed region of FIG. 8 isolated from surrounding structure and rotated 180 degrees around the long central axis of the central shaft.
Figure 11:
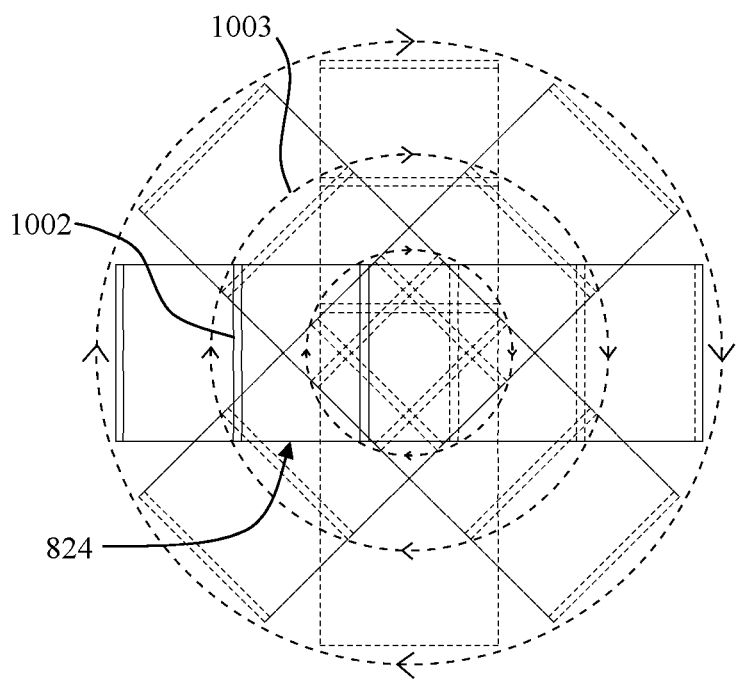
FIG. 11 shows a top plan view of the blades of the first enclosed region of FIG. 8 isolated from surrounding structure and rotated 45, 90 and 135 degrees around the long central axis of the central shaft.

FIGS. 10 and 11 show simplified views of the rotational motion of the blades 824 of the first enclosed region 814 of the embodiment of FIG. 8. FIG. 10 shows the blades 824 of the first enclosed region 814 of the embodiment of FIG. 8 isolated from and without the first rim support member 802, the second rim support member 806, the first curved rim member 116 and the second curved rim member 118. The isolated blades 824 of FIG. 10 are shown in solid lines in a first position 1002, then rotated 180 degrees along a circular path 1003 to a second position 1004. Each end of each blade 824 travels a separate, concentric circular path around the long central axis 816. The circumference of each path is at a minimum where a blade 824 intersects 1005 the long central axis 816. FIG. 11 shows a top plan view of isolated blade 824 rotational paths, with blades 824 rotated 45, 90 and 135 degrees around the long central axis 816 of the central shaft 102. Although the rotational paths shown in FIG. 10 are tilted slightly with respect to the long central axis 816 to better show their circular nature, when the mixing paddle 100 is in use the long central axis 816 is orthogonal to the circles bounded by the rotational paths.

Embodiments of the invention may be manufactured from materials such as but not limited to stainless steel, cast iron, aluminum, ceramics and plastics by casting, machining, welding, 3-D printing and other techniques well-known in the art. The mixing paddle may then be used with stand mixers, hand mixers and other mixing apparatus known in the art.

In an alternate embodiment of the invention a scraper may be attached to one of more rim members to remove and collect ingredients from inner sides of a mixing bowl when the mixing paddle rotates. The scraper can be made of materials such as but not limited to metal, plastic and rubber. The scraper can be thinner or thicker than the rim members with the same shape as the curved rim members.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

I claim:

1. A mixing paddle, comprising:
    a central shaft, the central shaft having a long central axis, an attachment member and a blade support member, the attachment member operable to attach the mixing paddle to a mixing device beater shaft;
    a rim, the rim including at least a first curved rim member and a second curved rim member, the first curved rim member joined to the second curved rim member at an apex, the first curved rim member reflectively symmetrical to the second curved rim member, the long central axis intersecting the apex, the first curved rim member and the second curved rim member at least partially surrounding the blade support member and disposed symmetrically with respect to the blade support member, the second curved rim member joined to the blade support member by at least a first rim support member at an angle between 80 and 100 degrees; and
    a plurality of blades, at least a first blade and a second blade attached at proximal ends to the first rim support member, the first blade and second blade attached at distal ends to the first curved rim member, the first blade and the second blade oriented at angles between 85 and 95 degrees with respect to the first rim support member, the first blade and the second blade oriented at angles between 50 and 60 degrees with respect to the long central axis, the first blade and the second blade separated by a distance between 6 millimeters and 13 millimeters, at least a third blade attached at a proximal end to the blade support member and at a distal end to the second curved rim member, the third blade oriented at an angle between 80 and 100 degrees with respect to the second curved rim member, the third blade separated from the first rim support member by a distance between 6 millimeters and 13 millimeters.

2. A mixing paddle as claimed in claim 1, wherein the blades are roughened on at least one edge.

3. A mixing paddle, comprising:
    a central shaft, the central shaft including a long central axis, a base member, an attachment member and a blade support member, the attachment member operable to attach the mixing paddle to a mixing device beater shaft, the base member being cylindrical and having a first base member end and a second base member end, the first base member end including the attachment member, the blade support member integral with the second base member end, the blade support member having a first transverse axis and a second transverse axis, the blade support member tapering from the second base member end to a blade support member end;
    a scutiform rim, the rim including at least a first curved rim member, a second curved rim member, a first straight rim member and a second straight rim member, a distal end of the first straight rim member joined to the first curved rim member, a distal end of the second straight rim member joined to the second curved rim member, proximal ends of the first straight rim member and the second straight rim member joined to the second base member end, the first straight rim member and the second straight rim member radiating from opposite sides of the second base member end and normal to the base member, the first curved rim member joined to the second curved rim member at an apex, the first curved rim member reflectively symmetrical to the second curved rim member, the long central axis intersecting the apex, the first curved rim member and the second curved rim member surrounding the blade support member and disposed symmetrically with respect to the blade support member;

a bisecting plane, the bisecting plane including the long central axis and bisecting the central shaft and the rim into equal and reflectively symmetrical halves;

a first rim support member, a second rim support member and a third rim support member, the second curved rim member joined to the blade support member end by the first rim support member, the second curved rim member joined to the first rim support member at an angle between 80 and 100 degrees, the first curved rim member joined to the blade support member by the second rim support member, the first curved rim member joined to the second rim support member at an angle between 80 and 100 degrees, the second curved rim member joined to the blade support member by the third rim support member, the second curved rim member joined to the third rim support member at an angle between 80 and 100 degrees;

a first enclosed region, a second enclosed region, a third enclosed region and a fourth enclosed region, the fourth enclosed region bordered by the blade support member, the second rim support member, the first curved rim member and the first straight rim member, the second enclosed region bordered by the blade support member, the first rim support member, the second curved rim member and the third rim support member, the third enclosed region bordered by the blade support member, the third rim support member, the second curved rim member and the second straight rim member, the first enclosed region bordered by the first rim support member, the blade support member end, the second rim support member, the first curved rim member, the apex and the second curved rim member; and a plurality of blades, each blade having a wide dimension, the wide dimension of each blade normal to the bisecting plane, each blade separated from adjacent blades, rim support members and straight rim members by a distance between 6 millimeters and 13 millimeters, each blade joining a rim member between 80 and 110 degrees, blades within the first enclosed region joined at opposite ends to the first curved rim member and the first rim support member, the long central axis disposed between the ends of each blade within the first enclosed region, blades within the first region oriented at angles between 50 and 60 degrees with respect to the long central axis, blades within the second and third enclosed regions joined at opposite ends to the blade support member and the second curved rim member, and blades within the fourth enclosed region joined at opposite ends to the blade support member and the first curved rim member.

4. A mixing paddle as claimed in claim 3, wherein the blades are roughened on at least one edge.

5. A mixing paddle as claimed in claim 4, wherein roughened edges on blades within the second and third enclosed regions are on an opposite side of the bisecting plane with respect to roughened edges on the blades within the fourth enclosed region.

6. A mixing paddle as claimed in claim 4, wherein blades with the first enclosed region have two roughened edges.

7. A mixing paddle as claimed in claim 3, wherein the blade support member tapers more rapidly on the first transverse axis than on the second transverse axis.

8. A mixing paddle as claimed in claim 7, wherein the blade support member tapers from a circular cross-section to an elliptical cross-section.

* * * * *